Patented June 5, 1945

2,377,507

UNITED STATES PATENT OFFICE 2,377,507

SAPOGENIN OXIDATION PRODUCTS AND PROCESS FOR PREPARING THE SAME

Russell Earl Marker, State College, Pa., assignor to Parke, Davis & Company, Detroit, Mich., a corporation of Michigan No Drawing. Application August 3, 1940, Serial No. 351,147

9 Claims. (Cl. 260—239.5)

This invention relates to sapogenin oxidation products and process for preparing the same.

Accordingly, an object of this invention is the preparation of new sapogenin oxidation products.

Another object of this invention is a process for the preparation of sapogenin oxidation products.

Still another object of this invention is the preparation of sapogenin oxidation products suitable as intermediates for the preparation of steroidal hormones.

Other objects of this invention will be apparent after a perusal of this specification and the appended claims.

The steroidal sapogenins have, in general, the formula $C_{27}H_{42-4}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

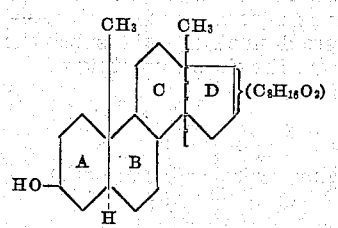

or

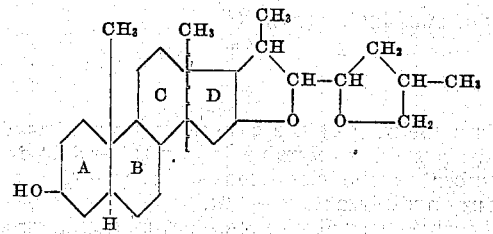

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings.

These differences are shown below:

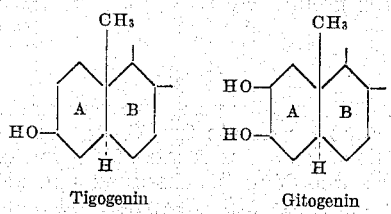

Tigogenin  Gitogenin

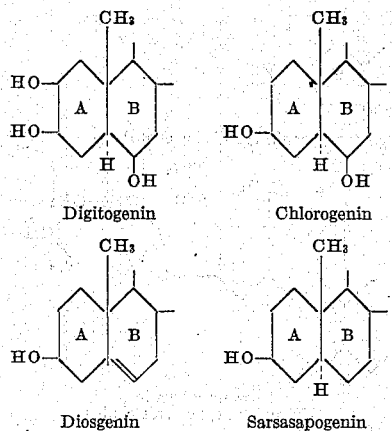

Digitogenin  Chlorogenin

Diosgenin  Sarsasapogenin

I have recently suggested (Marker & Rohrmann J. Am. Chem. Soc. 61, 846 (1939)) that a more likely structure for the side chain of these steroidal sapogenins is that shown below.

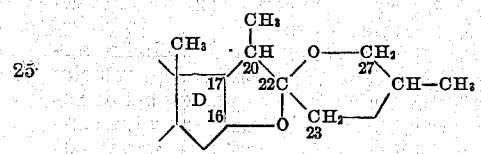

It is apparent that this formulation differs from that of Tschesche and Hagedorn in that the linkage, $C_{27}—O—$, is transferred from $C_{23}$ to $C_{22}$. However, a profound difference in the nature of the functional character of the side chain oxygen atoms is implied, for while the Tschesche-Hagedorn formula is that of an $α, α'$ di-tetrahydrofuryl derivative, the Marker-Rohrmann formula is that of a spiro-ketal.

Recently it has been found (Marker & Rohrmann, J. Am. Chem. Soc. 61, 846, 1516, 2724, 3479, (1939); 62, 647, 896, 1162) that the side chain of the naturally occurring sapogenins exists in two modifications. Sarsasapogenin and neotigogenin contain one type of side chain characterized by the fact that a sapogenin of this type is readily reduced according to the Clemmensen procedure using alcoholic hydrochloric acid and amalgamated zinc (Marker & Rohrmann, J. Am. Chem. Soc. 61, 846 (1939)) to give tetrohydro derivatives, that is to say, new sapogenin derivatives in which the side chain has 4 more hydrogen atoms than in the sapogenins themselves. Tigogenin, gitogenin, digitogenin, chlorogenin and diosgenin behave differently from sarsasapogenin and neotigogenin in that they are not reduced by the Clemmensen procedure, that is to say, they are recovered unchanged after boiling with alcoholic hydrochloric acid and amalgamated zinc. Isosarsasapogenin is converted under the conditions of the Clemmensen reduction to the same tetrahydrosarsasapogenin that sarsasapogenin itself yields. These facts, and others which are cited in the references listed, appear to me to be best explained by assuming that the two types of steroidal sapogenin side chains differ in regard to optical isomerism about $C_{22}$. Accordingly, when it is necessary to distinguish between isomers about $C_{22}$ I represent the two types of side chains by formulae of the following type:

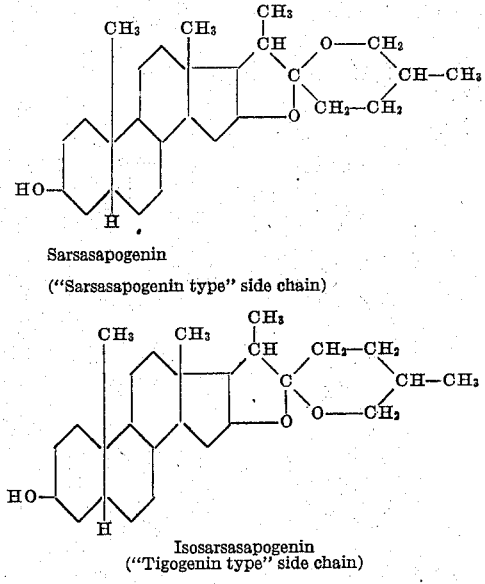

Sarsasapogenin
("Sarsasapogenin type" side chain)

Isosarsasapogenin
("Tigogenin type" side chain)

See especially Marker & Rohrmann, J. Am. Chem. Soc. 62, 896 (1940). Ordinarily where isomerism about $C_{22}$ is not of importance, the formula for the sarsasapogenin type of side chain will be used for configurations both of sarsasapogenin and tigogenin type.

These two types of sapogenin side chains appear to be subject to an equilibrium, the velocity of attainment of which is catalyzed by acidic reagents. The equilibrium is influenced by the configuration of the hydrogen atom at $C_5$, and it appears that the following rule holds true. For compounds of the allo series (cholestane type) the tigogenin type of side chain is the more stable, while for compounds of the regular series (coprostane type) at $C_5$ the sarsasapogenin side chain is the more stable.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

I have found that the steroidal sapogenins and certain derivatives thereof may be oxidized to give new sapogenin oxidation products which are valuable as intermediates for the preparation of steroidal hormones.

In practicing my invention I proceed as follows: The sapogenin or the derivative thereof which is to be oxidized is first treated with reagents to protect nuclear hydroxyl groups and/or double bonds. For instance, nuclear hydroxyl groups are treated with acylating, aralkylating or halogenating agents to form the corresponding —O—acyl, —O—aralkyl or halogen derivative. Nuclear double bonds are protected by addition of hydrogen halide or halogen. Then the nuclearly protected sapogenin or derivative thereof is oxidized, preferably with a reagent selected from the group consisting of compounds of hexavalent chromium and compounds of heptavalent manganese. The reaction mixture is separated into alkali-soluble and alkali-insoluble fractions, and each of these fractions is further separated into its components by crystallization, partition between immiscible solvents, conversion into insoluble derivatives, high vacuum distillation, chromatographic adsorption or other methods adapted to the properties of the substances to be isolated.

My invention also comprehends certain new classes of steroidal sapogenin oxidation products. One of these classes of compounds may be represented by the following formula

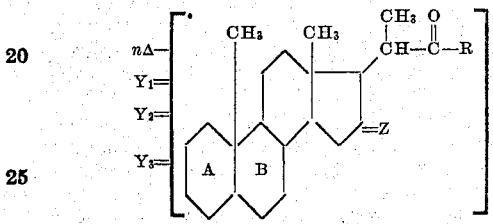

where the group $C_8H_{15}O_2R'$ contains the radical

and where the symbol $n\Delta$ represents $n$ carbon-to-carbon double bonds in the A—B portion of the steroid nucleus, $n$ having one of the values 0 and 1, $Y_1$, $Y_2$ and $Y_3$ are substituents attached to methylene carbon atoms in the A—B portion of the steroid nucleus, said substituents being selected from the class consisting of

(=O), groups hydrolyzable to (=O)

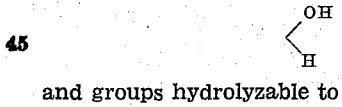

and groups hydrolyzable to

Z is a member of the class consisting of (=O) and groups hydrolyzable to (=O), and R is a member of the class consisting of —OH and groups hydrolyzable to —OH.

Another class of new steroidal oxidation products may be represented by the formula

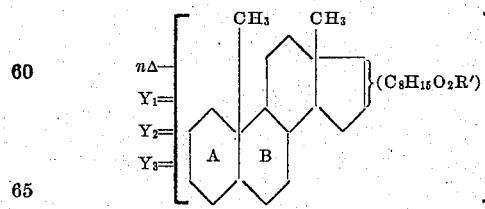

where the group $C_8H_{15}O_2R'$ contains the radical

and where the symbol $n\Delta$ represents $n$ carbon-to-carbon double bonds in the A—B portion of the steroid nucleus, $n$ having one of the values 0 and 1, $Y_1$, $Y_2$ and $Y_3$ are substituents attached to methylene carbon atoms in the A—B portion of the steroid nucleus, said substituents being selected from the class consisting of

(=O), groups hydrolyzable to (=O)

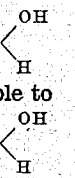

and groups hydrolyzable to

and R' is a member of the class consisting of —OH and groups hydrolyzable to —OH.

By the term "methylene carbon atom" is meant a carbon atom having not more than two carbon atoms attached to it. The methylene carbon atoms in the A—B portion of the steroid nucleus are carbon atoms 1, 2, 3, 4, 6 and 7.

Groups which are hydrolyzable to (=O) include groups such as =N—O—H, =N—NH-acyl, and =N—NH$_2$. Groups which are hydrolyzable to

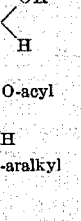

include

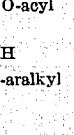

and halogen / H

Groups hydrolyzable to —OH include —O-alkyl, —NH$_2$, and halogen.

The above class of compounds are believed to have in ring D the structure:

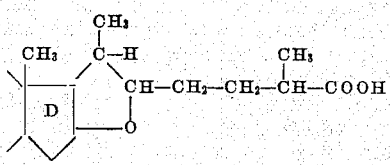

In accordance with the usual practice in drawing sterol formulae, the single hydrogen atoms attached to C$_{16}$ and C$_{17}$ have been omitted in the above formula. They are included, however, in the brackets when the formula is written as below:

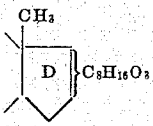

My invention may be illustrated by the following partial formulae in which only transformations of the side chain attached to ring D are shown:

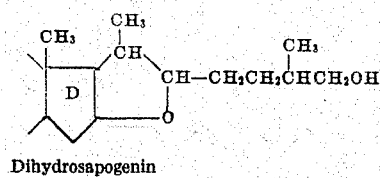

My invention may be further illustrated by the following examples:

Example 1

To a solution of 1.5 g. of dihydrosarsasapogenin (prepared as described, for example, by Marker & Rohrmann, J. Am. Chem. Soc., 61, 846 (1939)) in 40 cc. of glacial acetic acid, is added a solution of 1 g. of chromic anhydride in 20 cc. of 80% acetic acid and the resulting mixture is allowed to stand at room temperature for ninety minutes. The mixture is then poured into water and extracted with ether. The ether extract is washed first with water, then with dilute sodium carbonate solution. The sodium carbonate washings are acidified with hydrochloric acid and the resulting mixture extracted with ether. The ether extract is washed well with water and the ether evaporated on the steam-bath. The residue is crystallized from acetone-methanol to give white crystals of dehydrosarsasapogentic acid, melting point 198° C.

To 100 mg. of the above added in 7 cc. of 80% alcohol is added 300 mg. of semicarbazide hydrochloride and 400 mg. of sodium acetate. The resultant solution is heated on the steam-bath for 1 hour and then the solution is chilled in ice-salt and the white crystals collected and washed with water. The material is recrystallized from 95% alcohol to give the semicarbazone of dehydrosarsasapogentic acid of melting point 18° C., dec.

Dehydrosarsasapogentic acid may be represented by the formula

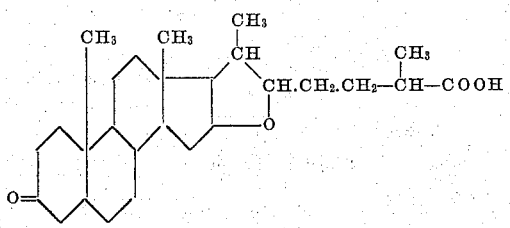

The dihydrosarsasapogenin starting material of this example may be represented by the formula,

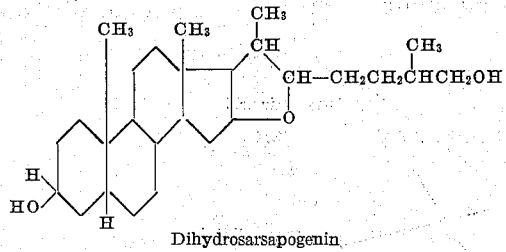

Dihydrosarsasapogenin

Example 2

Five g. of sarsasapogenin acetate is hydrogenated in ethanol acidified with hydrochloric acid and the unhydrolyzed sirup consistinf of the 3-monoacetate of dihydrosarsasapogenin thus obtained is dissolved in 150 cc. of glacial acetic acid. To this solution is added a solution of 2 g. of chromic anhydride in 60 cc. of 80% acetic acid. The mixture is allowed to stand at room temperature for 1 hour when it is diluted with water. The precipitated solid is extracted with ether and the ethereal extract washed well with water and then with 5% sodium carbonate solution.

The sodium carbonate washings are acidified with hydrochloric acid and extracted with ether. The ethereal extract is washed with water and the ether evaporated on the steam-bath. The residue is saponified by heating on the steam-bath for twenty minutes with an excess of 3% aqueous sodium hydroxide solution. The solution is then acidified with hydrochloric acid and the precipitated acid extracted with ether. The ether is evaporated on the steam-bath and the residual oil crystallized from aqueous methanol to give white crystals, M. P. 187° C. of sarsasapogentic acid.

The methyl ester of sarsasapogentic acid may be obtained as follows: A solution of 100 mg. of the hydroxy acid obtained as described above in a mixture of 2 cc. of methanol and 8 cc. of ether, after cooling in ice, is treated with an excess of an ethereal solution of diazomethane. The resulting mixture is allowed to stand at room temperature for fifteen minutes, after which the solvent is boiled off on the steam-bath. The residue is crystallized from ether-hexane to give white plates melting at 124° C.

Example 3

To a solution of 700 mg. of dihydrotigogenin (prepared as described, for example, by Marker & Rohrmann, J. Am. Chem. Soc., 61, 1516 (1939)) in 75 cc. of glacial acetic acid is added a solution of 1 g. of chromic anhydride in 10 cc. of 80% acetic acid. The mixture is allowed to stand at 25° C. for one hour, after which it is diluted with water. The precipitated solid is taken up with ether and the ethereal extract washed with 5% sodium carbonate solution. The sodium carbonate washings is acidified with hydrochloric acid and the precipitated solid extracted with ether and crystallized from ether-pentane to give white crystals, M. P. 192° dehydrotigogentic acid. The substance gives a positive Zimmermann test.

The dihydrotigogenin starting material of this example may be represented by the formula,

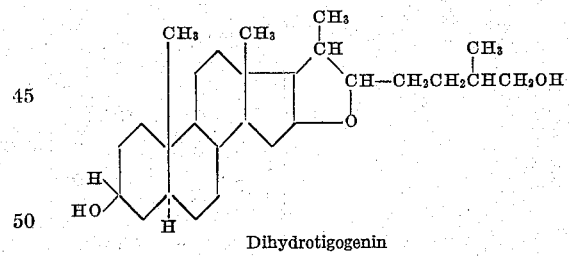

Dihydrotigogenin

Example 4

To a solution of 1.5 g. of dihydrochlorogenin (prepared, for example, as described by Marker & Rohrmann, J. Am. Chem. Soc., 61, 3479 (1939)) in 60 cc. of glacial acetic acid is added a solution of 1.5 g. of chromic anhydride in 30 cc. of 80% acetic acid. After standing at room temperature for two hours the solution is diluted with water and the mixture extracted with ether. The ethereal extract is washed first with water and then with dilute sodium carbonate solution. The sodium carbonate washings are acidified with hydrochloric acid and the white precipitate which separated is collected and washed with water. The dried material is crystallized from acetone as white plates, M. P. 202–204° C. This is dehydrochlorgentic acid.

The acid reacts with an ethanolic solution of semicarbazide acetate under the usual conditions to yield a disemicarbazone which is crystallized from ethanol to give a product, with M. P. 240° C. dec.

With diazomethane the acid yields a methyl ester which is crystallized from ether-pentane as white needles, M. P. 156.5–158° C.

The dihydrochlorogenin starting material of this example may be represented by the formula,

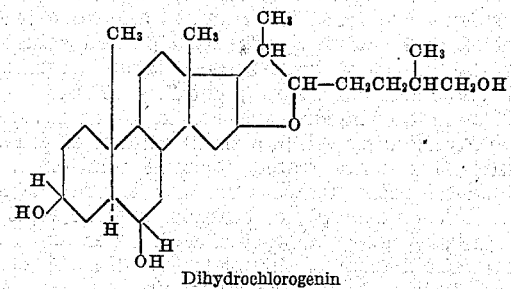

Dihydrochlorogenin

Example 5

A mixture of 20 g. of dihydrosarsasapogenin, M. P. 165–166° C., and 200 cc. of acetic anhydride is refluxed for thirty minutes. The acetic anhydride is evaporated in vacuo and the residual sirup dissolved in 400 cc. of acetic acid. The well stirred solution is heated at 90–95° C. on a steam-bath while 44 g. of chromic anhydride in 250 cc. of 80% acetic acid is added over a period of two hours, after which the mixture is heated for an additional two hours. The mixture is concentrated in vacuo to a volume of about 100 cc. The residual material is diluted with water and the precipitated solids taken up in ether. The ethereal solution, after thorough washing with water, is washed twice with 3% sodium hydroxide solution to remove the acidic fraction.

The ether solution containing the neutral material is evaporated to a sirup which is hydrolyzed by refluxing with an excess of ethanolic potassium hydroxide. The resulting solution is diluted with water and the precipitated solid taken up in ether. The alkaline water layer is washed several times with ether. Evaporation of the combined ether extracts gives approximately 2 g. of a neutral sirup. The alkaline water layer is acidified with hydrochloric acid and the mixture extracted with ether. Evaporation of the ether gives almost 600 mg. of crude lactonic material (non-crystalline). This is sublimed in high vacuum and the material distilling at 140–160° is crystallized from ether-pentane to give fine white needles, M. P. 200–201.5° C. This gives no depression with the hydroxy lactone from sarsasapogenin, M. P. 200–201.5° C.

The sodium hydroxide washings containing the acidic material from the oxidation is heated on the steam-bath for twenty minutes to complete the hydrolysis. The cooled mixture is acidified with hydrochloric acid and the precipitated acids taken up in ether. Upon standing the ethereal solution deposits 600 mg. of small compact white crystals which are recrystallized once from methanol to give a product, M. P. 285–288° C. dec. This is the $C_{22}$ keto acid, M. P. 285–287° C. dec.

This substance may be represented by the formula

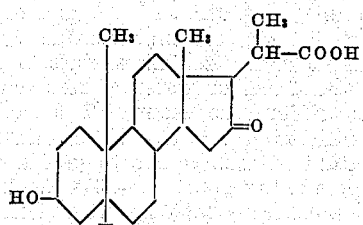

The filtrate remaining after removal of the $C_{22}$ keto acid is evaporated and the residual sirup crystallized from chloroform to give 1.9 g. of white crystals, M. P. 219–222° C. This is 3-β-hydroxy-etio-bilianic acid.

When refluxed for thirty minutes with acetic anhydride the acid forms the acetate anhydride, M. P. 202–203.5° C.

Example 6

To a solution of 1 g. of sarsasapogenin acetate in 100 cc. of acetic acid at 20° C. is added 50 cc. of 1 N aqueous potassium permanganate solution. The temperature is maintained at 18 to 20° C. for fifteen hours, after which the mixture is diluted with water and extracted with ether. The ethereal extract is washed well with water and then with 3% sodium hydroxide solution.

Evaporation of the ether solution containing the neutral products gives a sirup which is hydrolyzed with hot ethanolic potassium hydroxide. Dilution of the resulting solution with water gives a slight precipitate which is taken up in ether and discarded. The aqueous alkaline solution is acidified with hydrochloric acid and the precipitated material taken up in ether. After sublimation in high vacuum at 160–180° the product is crystallized from ether-pentane to give white needles, M. P. 198–200° C. This is the $C_{22}$ lactone related to sarsasapogenin. It may be represented by the formula

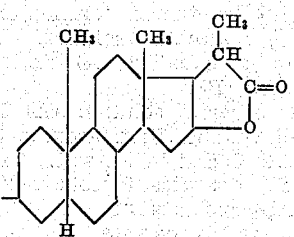

The sodium hydroxide washings containing the acidic fraction from the oxidation is heated on the steam-bath for fifteen minutes to complete the hydrolysis. Acidification of the cooled solution with hydrochloric acid yields a white solid which is taken up in ether and crystallized from this solvent to give 225 mg. of white crystals. The product is recrystallized from methanol to give a product, M. P. 286–288° C. dec. This is the $C_{22}$ keto acid identical with that described in Example 5.

The filtrate remaining after removal of the above acid is evaporated and the sirup crystallized from aqueous acetone to give 150 mg. of white crystals, M. P. 185° C. The product is recrystallized from ether-pentane as white plates, M. P. 186–188° C. This gives no depression with an authentic sample of sarsasapogenoic acid, M. P. 187–189° C.

Similar results are obtained when the oxidation is carried out at 50–70° C. for two hours.

Example 7

To a solution of 800 mg. of the lactone acetate, M. P. 183–184° C., the lactone from sarsasapogenin acetate (obtained as described, for instance, in Example 6) in 30 cc. of glacial acetic acid is added a solution of 2 g. of chromic anhydride in 40 cc. of 80% acetic acid. The resulting solution is heated on the steam-bath at 90° C. for three hours. The mixture is diluted with water and extracted with ether. The ethereal extract is washed well with water and then extracted with 3% sodium hydroxide solution. The sodium hydroxide extract is heated for twenty minutes on the steam-bath, cooled, acidified with hydrochloric acid and the solid acid extracted with ether. The ether upon slow evaporation deposits compact white crystals. These, after crystallization from ether-methanol, melted at 285–287° C. dec. and give no depression with a sample of the C$_{22}$ keto acid, M. P. 285–287° C.

Treatment of the methyl ester of the keto acid with boiling acetic anhydride for thirty minutes followed by decomposition of the excess acetic anhydride with water yields a methyl ester acetate which crystallizes from ether-pentane as compact white crystals, M. P. 198–199.5° C.

Treatment of the acid with hydroxylamine hydrochloride under the usual conditions gives an oxime which crystallizes from aqueous methanol as small compact white crystals, M. P. 206–208° C. dec.

*Example 8*

(a) To a solution of 20 g. of sarsasapogenin acetate in 500 cc. of glacial acetic acid at 60–70° is added slowly over a period of 4 hours, a solution of 12 g. of chromic anhydride in 200 cc. of 90% acetic acid. The mixture is stirred an hour longer, then alcohol is added and the solution evaporated to a sirup. This sirup is dissolved in ether and the ethereal solution extracted with 3% sodium hydroxide solution. The ethereal solution may be called (A) and the alkaline extract called (B).

(b) The ethereal solution (A) is evaporated to a small volume, then acetone is added and the mixture chilled in ice-salt. The crystalline crop which separates is collected and washed with a little cold acetone.

This material is recrystallized repeatedly from acetone to give white needles of melting point 162–164° C. of a neutral compound, which is more highly oxygenated than sarsasapogenin acetate itself. It analyzes for the formula C$_{29}$H$_{44}$O$_5$. It may be called the acetate of oxo-sarsasapogenin.

This acetate may be hydrolyzed by refluxing it for half an hour, using 1% alcoholic potassium hydroxide to give the parent oxo-sarsasapogenin. This is purified by crystallization from acetone, thereby giving small white plates of melting point 215–217° C. This compound has the formula C$_{27}$H$_{42}$O$_4$. The fourth oxygen atom is present as a ketone group, for the acetate of oxo-sarsasapogenin may be treated with semicarbazide acetate in alcohol to give a semicarbazone which crystallizes from acetone as small white needles of melting point 249–251° C., dec.

The acetate of oxo-sarsasapogenin may be hydrogenated as follows:

A mixture of 1.5 g. of the acetate of oxo-sarsasapogenin, one g. of Adams' platinum oxide catalyst, 100 cc. glacial acetic acid and 30 cc. of absolute alcohol is shaken with hydrogen at three atmospheres pressure at 25° C. for fourteen hours. The mixture is filtered and the filtrate diluted with water, the precipitated solid extracted with ether and the ethereal extract washed with sodium carbonate solution. The ether is evaporated and the residue refluxed for twenty minutes with an excess of alcoholic sodium hydroxide solution. This solution is diluted with water, the precipitate collected and crystallized from methanol-ethanol giving white plates of melting point 215–217° C. This product may be called hydroxysarsasapogenin. It analyzes for the formula C$_{27}$H$_{44}$O$_4$.

(c) The alkaline solution (B) is warmed on a steam-bath for a few minutes and then it is cooled and acidified. The precipitated solid is crystallized from dilute acetone to give sarsasapogenoic acid of melting point 187–189° C.

The mother liquor is evaporated to dryness and the residue dissolved in a small amount of ether. After this concentrated ethereal solution has stood at room temperature for several days, small compact white crystals are deposited. These are collected, washed with ether and recrystallized from methanol to give the C$_{22}$ keto acid derived from sarsasapogenin. It may be represented by the following formula:

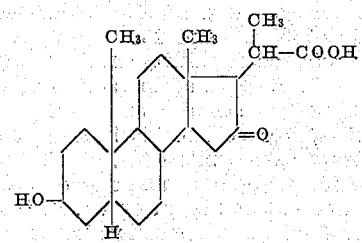

It has a melting point of 285–287° C., dec., (gas evolution), and it analyses for the formula C$_{22}$H$_{34}$O$_2$.

Better yields of this acid may be obtained by conducting the oxidation of sarsasapogenin acetate at 80–85° C., using two parts of chromic anhydride to one part of sarsasapogenin acetate. However, the yield of other oxidation products is less at these higher temperatures.

This C$_{22}$ keto acid is very sparingly soluble in ether, acetone, chloroform and ethyl acetate, but it is fairly soluble in methanol and ethanol.

The methyl ester of the above C$_{22}$ keto acid may be obtained by allowing a suspension of 200 mg. of the keto acid in 20 cc. of methanol-ether (1:1) containing an excess of diazomethane to stand over night. Then the solvent is evaporated and the residue crystallized from the ether-pentane to give clusters of small plates which melt at 124–126° C., solidify at 127° C. and remelt at 159° C.

Other esters of this acid may be prepared, for example, by treatment with an appropriate alcohol and a suitable catalyst. For example, 200 mg. of the C$_{22}$ keto acid may be refluxed with 100 cc. of 1% ethyl alcoholic hydrogen chloride for three hours. Then the solution is concentrated to a small volume, diluted with water and extracted with ether. The ethereal layer is separated, washed with dilute sodium hydroxide solution and water, and the ether evaporated. The residue is crystallized from ether-pentane to give white needles of the ethyl ester, melting point 163–164° C.

Derivatives of the ketone grouping may be obtained by treating the acid or its esters with ketone reagents having a reactive NH$_2$ grouping. For example, a solution of 100 mg. of the C$_{22}$ keto acid, 100 mg. of semicarbazide hydrochloride and 150 mg. of sodium acetate in 10 cc. of alcohol and 2 cc. of water is refluxed on the steam-bath for one hour. The solution is diluted with water and the white solid collected and crystallized from ether to give a semicarbazone of melting point 204–207° C., dec.

Other sapogenins may be treated in accordance with the directions of this example to give analogous products. Such sapogenins include tigogenin, gitogenin and diosgenin. The latter contains a nuclear double bond which is protected by addition of bromine prior to oxidation. Instead of protecting the hydroxyl groups by acetylation during the oxidation, other protecting agents may be used. For example, the sapogenin may be benzoylated, benzylated or halogenated, for example, by treatment with phosphorus pentachloride in carbon disulfide.

*Example 9*

To 10 cc. of fuming nitric acid maintained at 20° C. by an external cooling bath is added 1 g. of sarsasapogenin acetate in small portions. After awhile when the sarsasapogenin acetate has completely dissolved, the solution is diluted with water and the gummy precipitate collected. This gummy precipitate is boiled for a short time with alcoholic sodium hydroxide. Then the solution is diluted, extracted with ether and the alkaline layer separated. This alkaline extract is acidified and the precipitated acid taken up in ether. The ethereal layer is separated and most of the ether removed. On standing for several days, this concentrated ethereal solution deposits crystals of the $C_{22}$ keto acid derived from sarsasapogenin. This acid has the formula $C_{22}H_{34}O_4$, and it melts at 285–287° C., dec., (gas evolution).

It will be apparent that in view of this disclosure my invention is capable of numerous variations with regard to conditions of reaction, reagents and sapogenins employed.

Steroidal sapogenins on which this invention may be practiced include not only the aglycones of the naturally occurring steroidal sapogenins, but also their nuclear transformation products, i. e., the substances derived from the aglycones by changes in rings A and/or B which leave the side chain attached to ring D still intact and like that in the aglycones. Thus, this invention may be practiced on steroidal sapogenins such as smilagenin, sarsasapogenone, 3-desoxysarsasapogenin, the sarsasapogenyl chlorides, and the like.

It is apparent that sapogenins having in the side chain either configuration with regard to $C_{22}$ may be employed in practicing this invention, that is to say, compounds having a side chain either of the type of sarsasapogenin or of the type tigogenin may be oxidized in the manner set forth in this specification, and regardless of the configuration of the side chain of the sapogenin oxidized the structure of the oxidation products remain the same, for example, sarsasapogenin and isosarsasapogenin give the same oxidation products.

Some of the subject matter described but not claimed herein is being claimed in other copending applications. For example, the conversion of a sapogenin to a dihydrosapogenin is claimed in my copending application, Serial No. 351,144, filed August 3, 1940.

What I claim as my invention is:

1. Process for obtaining sapogenin oxidation products which comprises subjecting a dihydrosapogenin having in ring D the structure,

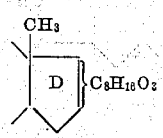

to mild oxidation by treating said dihydrosapogenin below 50° with an oxidizing agent selected from the class consisting of compounds of hexavalent chromium and compounds of heptavalent manganese, thereby forming a sapogentic acid having in ring D the structure,

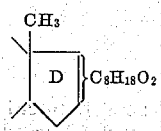

said side chain $C_8H_{18}O_2$ attached to ring D being identical with the ring D side chain obtainable by the known catalytic dihydrogenation of a naturally occurring sapogenin and said radical $C_8H_{16}O_3$ having the same chemical structure as the side chain of sarsasapogentic acid and containing an organic carboxylic acid radical, —COOH.

2. Process for obtaining sapogenin oxidation products which comprises subjecting a dihydrosapogenin having in ring D the structure,

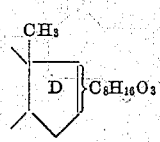

to mild oxidation by treating said dihydrosapogenin below 50° with chromic acid, thereby forming a sapogentic acid having in ring D the structure, said side chain $C_8H_{18}O_2$ attached to ring D being identical with the ring D side chain obtainable by the known catalytic dihydrogenation of a naturally occurring sapogenin and said radical $C_8H_{16}O_3$ having the same chemical structure as the side chain of sarsasapogentic acid and containing an organic carboxylic acid radical, —COOH.

3. Process for preparing C-3-dehydrosarsasapogentic acid which comprises subjecting side-chain-dihydrosarsasapogenin to oxidation by treatment below 50° with an oxidizing agent selected from the class consisting of compounds of hexavalent chromium and compounds of heptavalent manganese.

4. Process for preparing C-3-dehydrosarsasapogentic acid which comprises mildly oxidizing side-chain-dihydrosarsasapogenin with chromic acid below 50° C.

5. C-3-dehydrosarsasapogentic acid of formula,

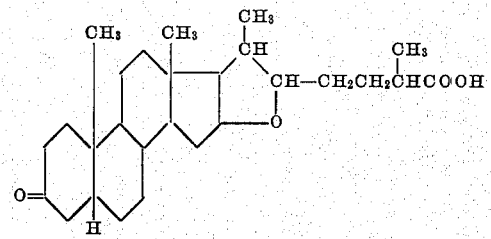

in which the stereo-chemical configuration at carbon atoms 20 and 22 is identical with that occurring in the dihydrosapogenins said acid having a melting point of approximately 192° C.

6. Sarsasapogentic acid of formula,

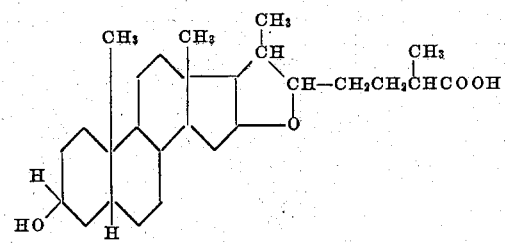

in which the stereo-chemical configuration at carbon atoms 20 and 22 is identical with that occurring in the dihydrosapogenins said acid having a melting point of approximately 187° C.

7. C-3-dehydrotigogentic acid of formula,

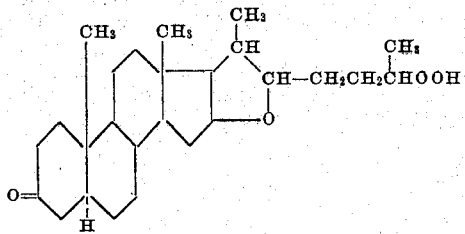

in which the stereo-chemical configuration at carbon atoms 20 and 22 is identical with that occurring in the dihydrosapogenins.

8. A compound of the formula

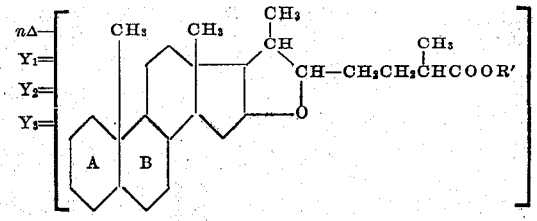

in which the stereo-chemical configuration at carbon atoms 20 and 22 is identical with that occurring in the dihydrosapogenins and where the symbol $n\Delta$ represents $n$ carbon-to-carbon double bonds in the A—B portion of the steroid nucleus, $n$ having one of the values 0 and 1, $Y_1$, $Y_2$ and $Y_3$ are substituents attached to methylene carbon atoms in the A—B portion of the steroid nucleus, said substituents being selected from the class consisting of

(=O), groups hydrolyzable to (=),

and groups hydrolyzable to

and R' is a member of the class consisting of —OH and groups hydrolyzable to —OH.

9. Process for obtaining sapogenin oxidation products which comprises subjecting a dihydrosapogenin having in ring D the structure

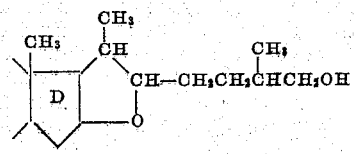

to mild oxidation by treating said dihydrosapogenin below 50° C. with chromic acid, thereby forming a sapogentic acid having in ring D the structure

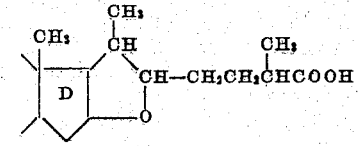

in which the stereo-chemical configuration at carbon atoms 20 and 22 is identical with that occurring in the dihydrosapogenins.

RUSSELL EARL MARKER.